O. C. NILSON.
MIXER AND STIRRER.
APPLICATION FILED MAY 13, 1911.
1,013,803.
Patented Jan. 2, 1912.
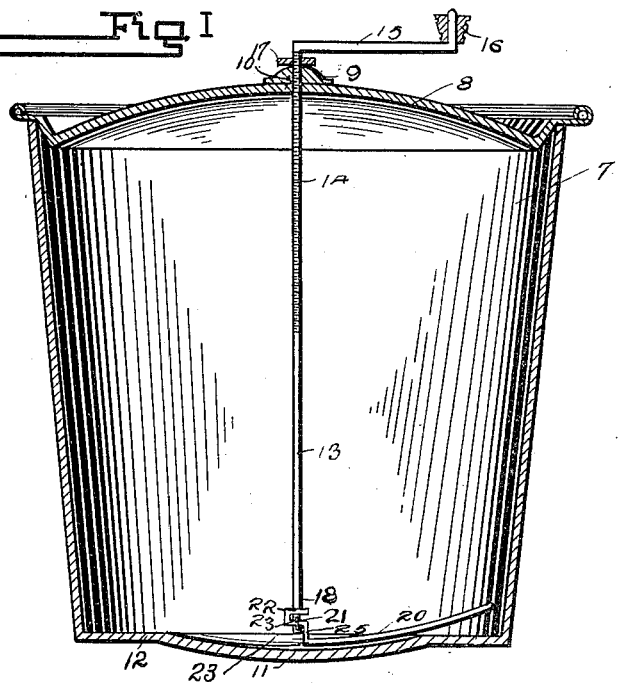
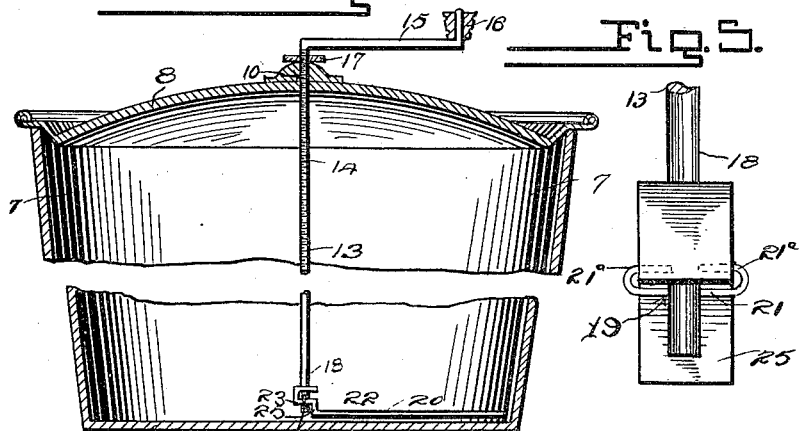
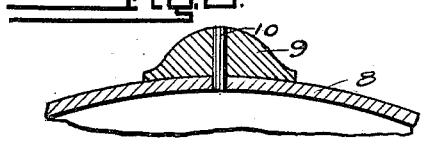
Witnesses
Howard F. Costello.
H. Jacob Doyle
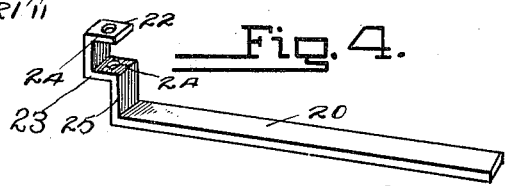
Inventor
Oliver C. Nilson.
By E. E. Vrooman,
Attorney.

# UNITED STATES PATENT OFFICE.

OLIVER C. NILSON, OF CARTHAGE, MISSOURI.

MIXER AND STIRRER.

1,013,803.  Specification of Letters Patent.  Patented Jan. 2, 1912.

Application filed May 13, 1911. Serial No. 626,956.

*To all whom it may concern:*

Be it known that I, OLIVER C. NILSON, a citizen of the United States, residing at Carthage, in the county of Jasper and State of Missouri, have invented certain new and useful Improvements in Mixers and Stirrers, of which the following is a specification, reference being had therein to the accompanying drawing.

This invention relates to stirrers and mixers especially adapted for use in cooking operations, and the principal object of the same is to provide a receptacle in which oatmeal, pop-corn, and the like can be cooked and agitated during the cooking operation by means of a novel stirrer so that danger of burning is obviated.

In the accompanying drawing I have shown preferred and practical embodiments of the invention, wherein:—

Figure 1 is a vertical sectional view of a receptacle constructed in accordance with this invention. Fig. 2 is a similar view showing a flat bottomed receptacle and a straight stirrer blade. Fig. 3 is a fragmentary detail sectional view of the cover of the receptacle. Fig. 4 is a detail perspective view of a stirrer blade forming a part of the invention. Fig. 5 is a rear elevation of the stirrer blade, the operating shaft thereof being shown fragmentarily.

Referring to the accompanying drawings by numerals, 7 designates the cooking or mixing receptacle that is provided with a removable cover 8, said cover carrying a central upstanding projection 9 through which an opening 10 is formed. A shaft 13 extends through the cover opening 10, and its upper portion is provided with threads 14 and an angular handle 15 projects from the upper end of said shaft and is equipped with a handgrip 16. A nut 17 engages the threaded portion of the shaft 13 and bears on the upper surface of the cover projection 9 so that by rotating said nut, the said shaft can be vertically adjusted.

A stirrer blade 20, that is preferably formed of flat metal, has its shank mounted on the lower portion 18 of the shaft 13 and rests on a pin 21 that extends through an opening 19 in said shaft. The shank and blade are preferably integral and said shank is shaped to provide the upper and lower spaced parallel flat flanges 22 and 23 which are provided with alined openings 24 through which the shaft 13 extends. The lower flange 23 is connected to the blade 20 by the neck 25 that projects at right angles from said blade. The pin 21 extends transversely through the shaft 13 and has its ends upturned to provide hooks 21ª that engage over opposite edges of the lower flange 23 of the blade shank, so that said pin supports the shank on the shaft, and also prevents the shank having rotary movement relative to the said shaft. The blade 20 is preferably shaped to correspond with the shape of the bottom of the receptacle 7. For instance, in Fig. 1 the blade is bowed to correspond with the contour of the concaved body of the receptacle, while in Fig. 2 the bottom of the receptacle is flat and the blade is a straight one. As will be obvious, the blade rotates with the shaft so that by rotating said shaft the blade will stir the contents of the receptacle. Normally the blade lies close to the bottom of the receptacle, but when desired the shaft 13 can be raised vertically by manipulating the adjusting nut 17 so that the blade can be operated at any desired distance above the bottom of the receptacle. It will be understood that the blade 20 can be readily removed from the shaft 13 by withdrawing the pin 21 from the opening 19.

What I claim is:—

1. A mixer and stirrer comprising a receptacle, a cover therefor, provided with a central projection, said projection being provided with an opening, a shaft extending through said opening, said shaft being provided with a handle, a blade provided with a shank having upper and lower spaced parallel flanges, said flanges being provided with alined openings through which the lower portion of the shaft extends, and means extending through said shaft and engaging said shank to support and prevent rotation of said shank relative to said shaft.

2. A mixer and stirrer comprising a receptacle, a cover therefor provided with a bearing opening, a shaft extending through said opening, means for rotating said shaft, a flat blade provided with an integral shank that is bent to provide a pair of spaced parallel flanges having alined openings through which said shaft extends, and removable means carried by said shaft for supporting and preventing relative rotation of said shank.

3. A mixer and stirrer comprising a receptacle, a cover therefor, a shaft journaled in the cover and projecting into the receptacle, a stirrer blade having a shank provided with a rebent end to form spaced parallel flanges having alined openings through which the shaft projects, and a pin extending through the shaft and forming a seat for said shank and having end hooks that engage opposite edges of one of said flanges.

In testimony whereof I hereunto affix my signature in presence of two witnesses.

OLIVER C. NILSON.

Witnesses:
W. S. CRANE,
F. B. WILLIAMS.

Copies of this patent may be obtained for five cents each, by addressing the "Commissioner of Patents, Washington, D. C."